(12) United States Patent
Situ et al.

(10) Patent No.: US 12,551,104 B2
(45) Date of Patent: Feb. 17, 2026

(54) PNEUMATIC ESTHESIOMETER WITH GAS PULSE-CONDITIONER

(71) Applicant: THE TRUSTEES OF INDIANA UNIVERSITY, Bloomington, IN (US)

(72) Inventors: Ping Situ, Bloomington, IN (US); Carolyn G. Begley, Bloomington, IN (US); William A. Monette, Columbus, IN (US); Trefford L. Simpson, Waterloo (CA)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 840 days.

(21) Appl. No.: 17/782,007

(22) PCT Filed: Dec. 9, 2020

(86) PCT No.: PCT/US2020/063954
§ 371 (c)(1),
(2) Date: Jun. 2, 2022

(87) PCT Pub. No.: WO2021/119093
PCT Pub. Date: Jun. 17, 2021

(65) Prior Publication Data
US 2023/0057998 A1 Feb. 23, 2023

Related U.S. Application Data

(60) Provisional application No. 63/007,193, filed on Apr. 8, 2020, provisional application No. 62/946,018, filed on Dec. 10, 2019.

(51) Int. Cl.
*A61B 3/16* (2006.01)

(52) U.S. Cl.
CPC .................. *A61B 3/165* (2013.01)

(58) Field of Classification Search
CPC ..... A61B 3/165; A61B 5/4824; A61B 5/4827; A61B 5/0048; A61B 5/0053
See application file for complete search history.

(56) References Cited

U.S. PATENT DOCUMENTS

| 4,023,587 | A | * | 5/1977 | Dobritz | G05D 11/133 |
| | | | | | 137/88 |
| 5,230,347 | A | | 7/1993 | Weinstein et al. | |
| 12,310,664 | B2 | * | 5/2025 | Buisan Ferrer | A61B 5/7405 |
| 2002/0186613 | A1 | | 12/2002 | Hiraoka et al. | |

(Continued)

FOREIGN PATENT DOCUMENTS

| AU | 2003270685 A1 * | 4/2004 | ........ A61M 16/0051 |
| WO | 1994012104 | 6/1994 | |

OTHER PUBLICATIONS

PCT International Search Report and Written Opinion completed by the ISA/US on Jan. 27, 2021 and issued in connection with PCT/US2020/063954.

*Primary Examiner* — Jennifer Robertson
*Assistant Examiner* — H Q Nguyen
(74) *Attorney, Agent, or Firm* — Barnes & Thornburg LLP

(57) ABSTRACT

A pneumatic esthesiometer adapted for measuring tactile sensitivity of a patient eye may include a pressurized gas supply system, a control system, and a pulse-conditioner. The pressurized gas supply system is configured to provide a flow of pressurized gases. The control system is configured to control the flow of pressurized gases.

16 Claims, 14 Drawing Sheets

(56) References Cited

U.S. PATENT DOCUMENTS

| | | |
|---|---|---|
| 2019/0000312 A1 | 1/2019 | Situ et al. |
| 2019/0099071 A1* | 4/2019 | Ehrmann |
| 2021/0259547 A1* | 8/2021 | Buisan Ferrer ...... A61B 5/4827 |
| 2021/0275020 A1* | 9/2021 | Pflugfelder .......... A61B 3/0083 |
| 2022/0331548 A1* | 10/2022 | Gulley .............. A61M 16/0051 |

* cited by examiner

PNEUMATIC ESTHESIOMETER WITH GAS PULSE-CONDITIONER

CROSS REFERENCE TO RELATED APPLICATIONS

This application is a U.S. national counterpart application of international application serial No. PCT/US2020/063954 filed Dec. 9, 2020, which claims priority to and the benefit of U.S. Provisional Patent Application No. 62/946,018, filed 10 Dec. 2019 and U.S. Provisional Patent Application No. 63/007,193, filed 8 Apr. 2020, the disclosure of which is now expressly incorporated herein by reference.

STATEMENT REGARDING FEDERALLY SPONSORED RESEARCH OR DEVELOPMENT

This invention was made with government support under EY021794 awarded by National Institutes of Health. The Government has certain rights in the invention.

SUMMARY

A pneumatic esthesiometer adapted to measure tactile sensation of a patient eye is disclosed in this application. The exemplary pneumatic esthesiometer may include a pressurized gas source, a control system, and a pulse-conditioner. The pressurized gas supply system is configured to provide a flow of pressurized gas. The control system is coupled to pressurized gas sources of the pressurized gas supply system and controls the gas mixture concentration, the pulse duration, and the flow rate of pressurized gases from the pressurized gas sources to the pulse-conditioner. The pulse-conditioner is coupled to the pressurized gas supply system to receive the flow of pressurized gases and to discharge the flow of pressurized gases in a controlled-profile gas pulse out of the esthesiometer toward a patient eye.

The controlled-profile gas pulse discharged by the pulse-conditioner has a substantially cylindrical shape over a predefined distance corresponding to the distant that the patient eye is spaced apart from the esthesiometer. The constant cylindrical shape of the controlled-profile gas pulse allows the user to repeatedly apply the controlled-profile gas pulse at various pressures to a target portion of the patient eye and achieve repeatable response related to sensation felt by a patient.

The pulse-conditioner illustratively includes a housing, a pulse heater, and a nozzle. The pulse heater is arranged within the housing and is configured to heat the flow of pressurized gas to a temperature greater than atmospheric temperature. The nozzle is coupled to the housing and configured to direct the controlled-profile gas pulse so as to repeatedly and accurately target the patient eye and obtain reliable results.

These and other features of the present disclosure will become more apparent from the following description of the illustrative embodiments.

DETAILED DESCRIPTION OF THE DRAWINGS

Figure 1:
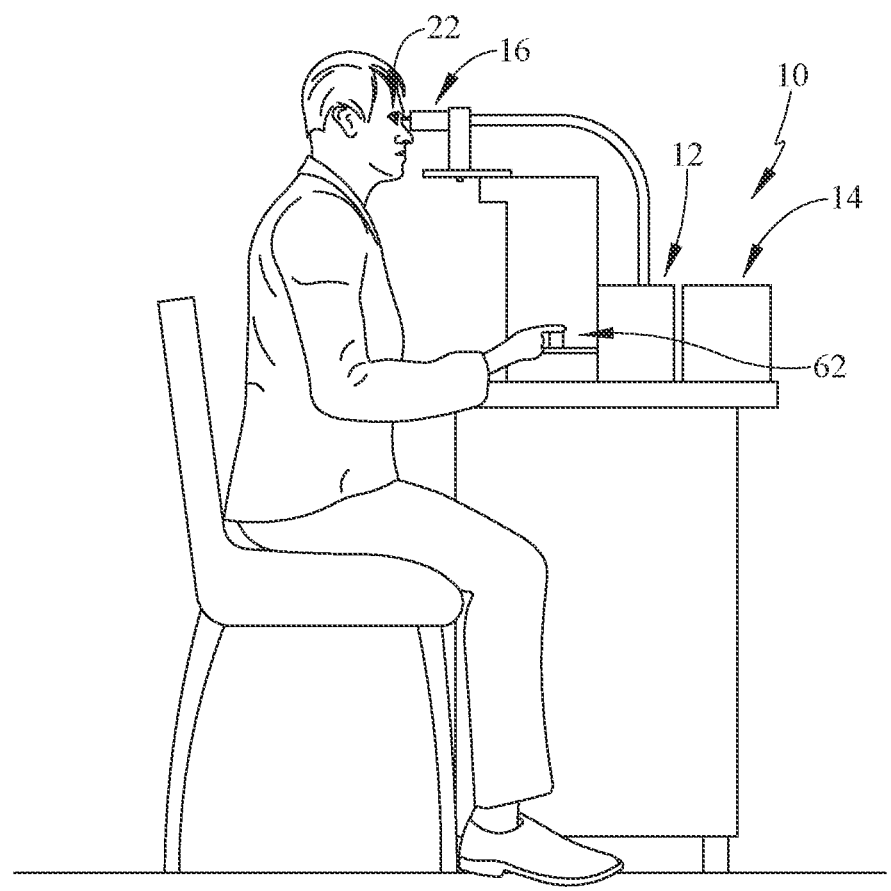
FIG. 1 is an elevation view of a pneumatic esthesiometer for tactile sensitivity measurements of a patient eye showing the pneumatic esthesiometer includes a pressurized gas source, a control system, and a pulse-conditioner.

For the purposes of promoting an understanding of the principles of the disclosure, reference will now be made to a number of illustrative embodiments illustrated in the drawings and specific language will be used to describe the same.

Figure 2:
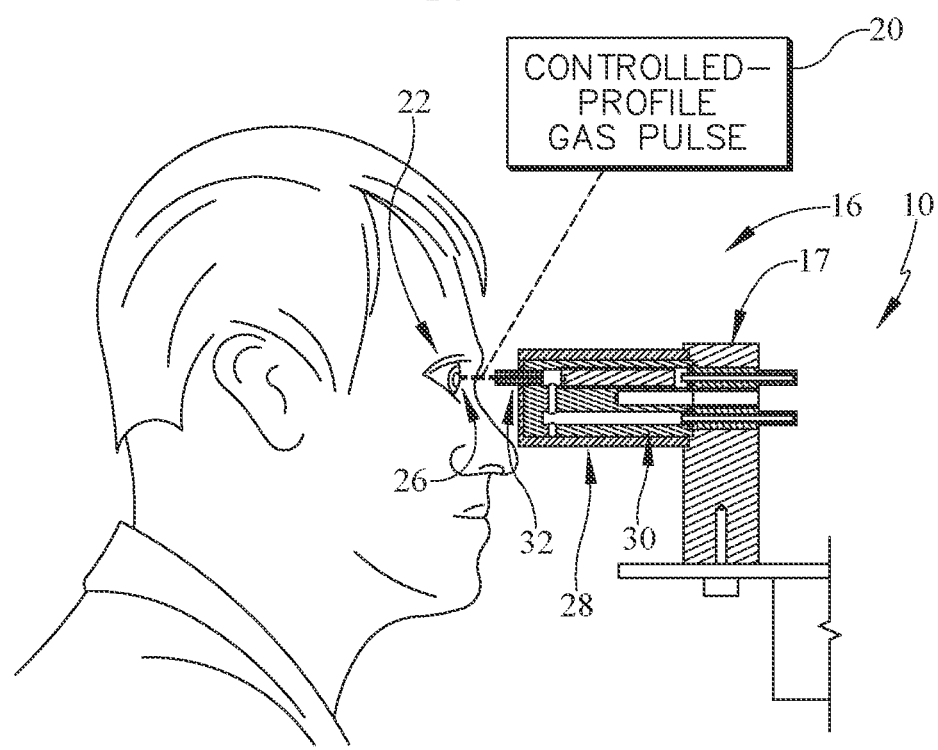
FIG. 2 is a detail view of the pneumatic esthesiometer of FIG. 1 showing the pulse-conditioner is configured to discharge a flow of pressurized gas in a heated controlled-profile gas pulse.
Figure 3:
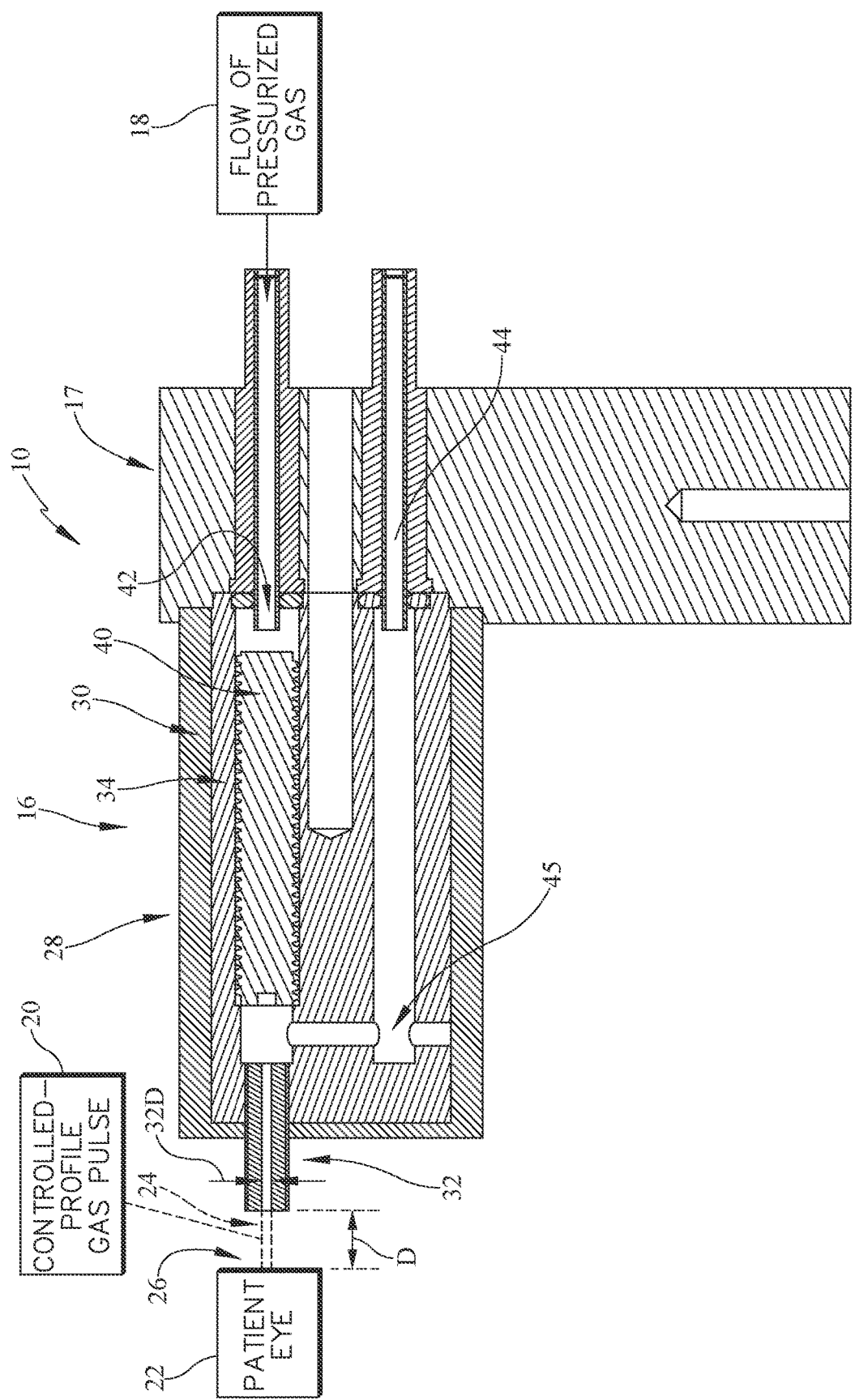
FIG. 3 is a diagrammatic and section view of the pulse-conditioner of FIG. 2 showing the pulse-conditioner includes a housing, a pulse heater, and a nozzle.

A pneumatic esthesiometer 10 adapted to measure tactile sensation of a patient eye 22 is shown in FIGS. 1-3. The esthesiometer 10 includes a pressurized gas supply system 12 having at least two pressurized gas sources 76 and 78, a control system 14, and a pulse-conditioner 16 as shown in FIGS. 1-3. The pressurized gas sources 76, 78 provide a flow of pressurized gases 18. The control system 14 is coupled to the pressurized gas sources 76, 78 and is configured to control the gas mixture, the pulse duration, and the flow rate of pressurized gases 18 from the pressurized gas supply system 12. The control system 14 may also receive and record inputs from the patient indicative of the patient feeling a sensation. The pulse-conditioner 16 is coupled to the pressurized gas sources 76, 78 of the system 12 to receive the flow of pressurized mixed gases 18 and is configured to discharge the flow of pressurized gases 18 in a controlled-profile gas pulse 20 directed toward the patient eye 22 as suggested in FIGS. 2 and 3.

Flexible control of a series of gas pulses in rapid succession, while repeatedly and accurately targeting the specific portion 26 of the patient eye 22 may be beneficial when testing patient eyes having dry eye disease or other sensitivity loss. Therefore, the esthesiometer 10 includes the control system 14 and the pulse-conditioner 16, or sometimes referred to as a nozzle 16, to control the flow of pressurized gases 18 in the controlled-profile gas pulse 20 so as to repeatedly and accurately target a specific portion 26 of the patient eye 22 with a series of variable controlled-profile gas pulses 20 and obtain reliable results.

The control system 14 is configured to control the gas mixture concentration, pulse duration, and intensity (flow rate) of the flow of pressurized gases 18, while the pulse-conditioner 16 is configured to discharge the flow of pressurized gases 18 in the controlled-profile gas pulse 20 so that the controlled-profile gas pulse 20 has a substantially cylindrical shape 24 over a predefined distance D as suggested in FIG. 3. The predetermined distance D is between an outlet of the pulse-conditioner 16 and the patient eye 22. The variable inputs of the control system 14 allow the user to repeatedly apply the controlled-profile gas pulse 20 with different gas mixture concentrations, durations, and flow rates to the target portion 26 of the patient eye 22 and achieve repeatable response related to sensation felt by a patient.

Figure 13:
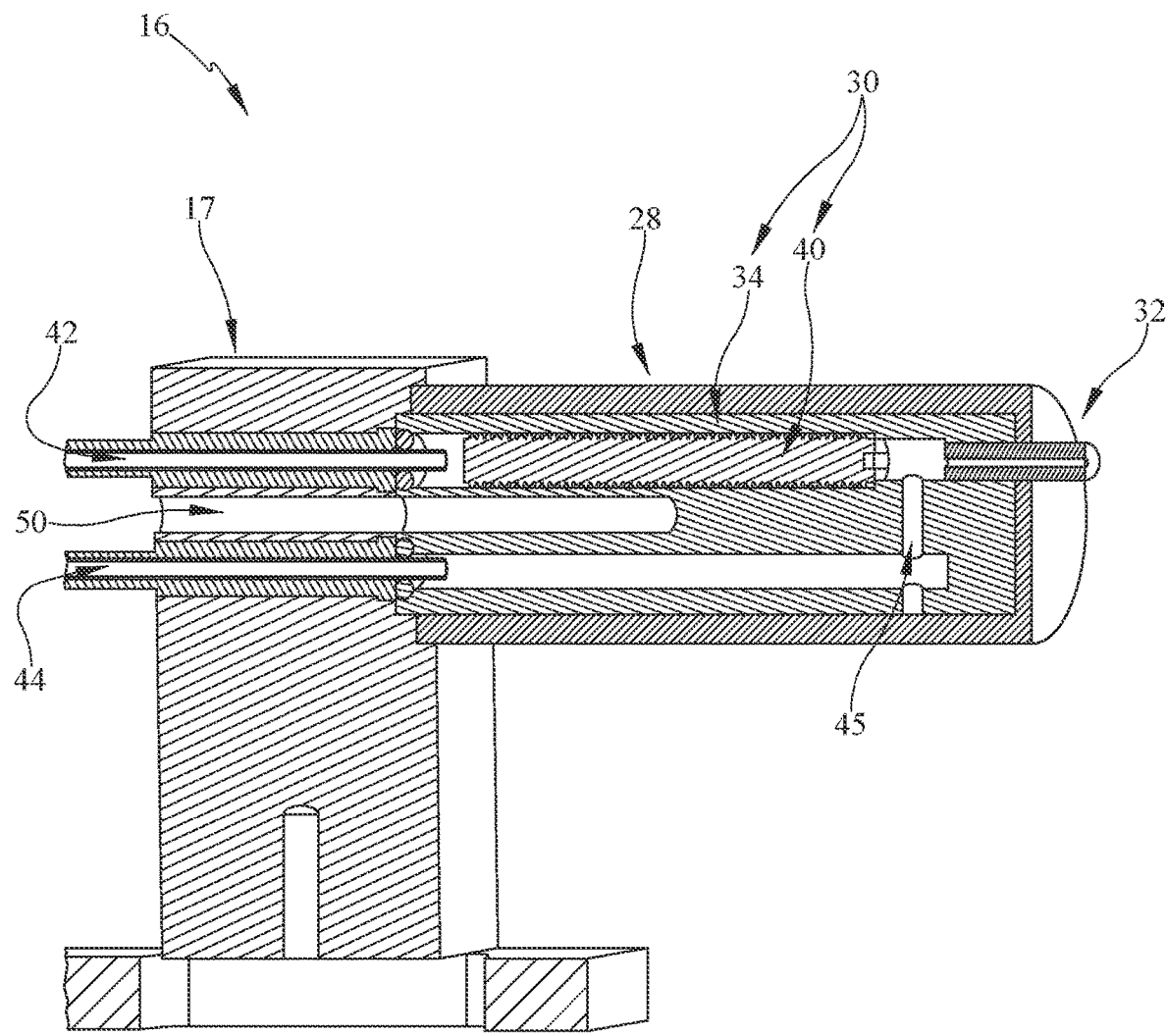
FIG. 13 is a perspective cross-section view of the p pulse-conditioner of FIG. 7 taken along line 13-13 showing the pulse heater included in the pulse-conditioner has a heater block shaped to form a plurality of channels that receive the flow of pressurized gas and a threaded rod arranged in an inlet channel of the plurality of channels to create an elongated flow path.

The pressurized gas supply system 12 includes a first pressurized gas source 76, a second pressurized gas source 78, and a vacuum assembly 80 as shown in FIG. 13. The first pressurized gas source, or first gas supply 76 is configured to store medical grade compressed air. The second pressurized gas source, or second gas supply 78 is configured to store pressurized $CO_2$ gas that may be mixed with the pressurized air from the first gas supply 76. Each supply 76, 78 has pressure regulators 82, 84 that control the pressure of the respective supply 76, 78. The vacuum assembly 80 is configured to evacuate any existing gas in the pulse-conditioner 16. In some embodiments, the pressurized gas supply system 12 further includes a third pressurized gas source 85 coupled to the mixing chamber 88 to provide a flow of third gas to the mixing chamber 88 as shown in FIG. 4.

In the illustrative embodiment, the supplies 76, 78 are coupled to a mixing chamber 88 included in the pressurized gas supply system 12 so as to mix the pressurized air and $CO_2$ gas as shown in FIG. 3. The mixing chamber 88 is fluidly coupled to an inflow channel 42 of the pulse-conditioner 16 to provide the flow of pressurized gases 18 to the pulse-conditioner 16. The vacuum assembly 80 is coupled to a vacuum outflow channel 44 of the pulse-conditioner 16 to evacuate the channels 42, 44, 45 of the pulse-conditioner 16 before the controlled-profile gas pulse 20 is administered.

Figure 4:
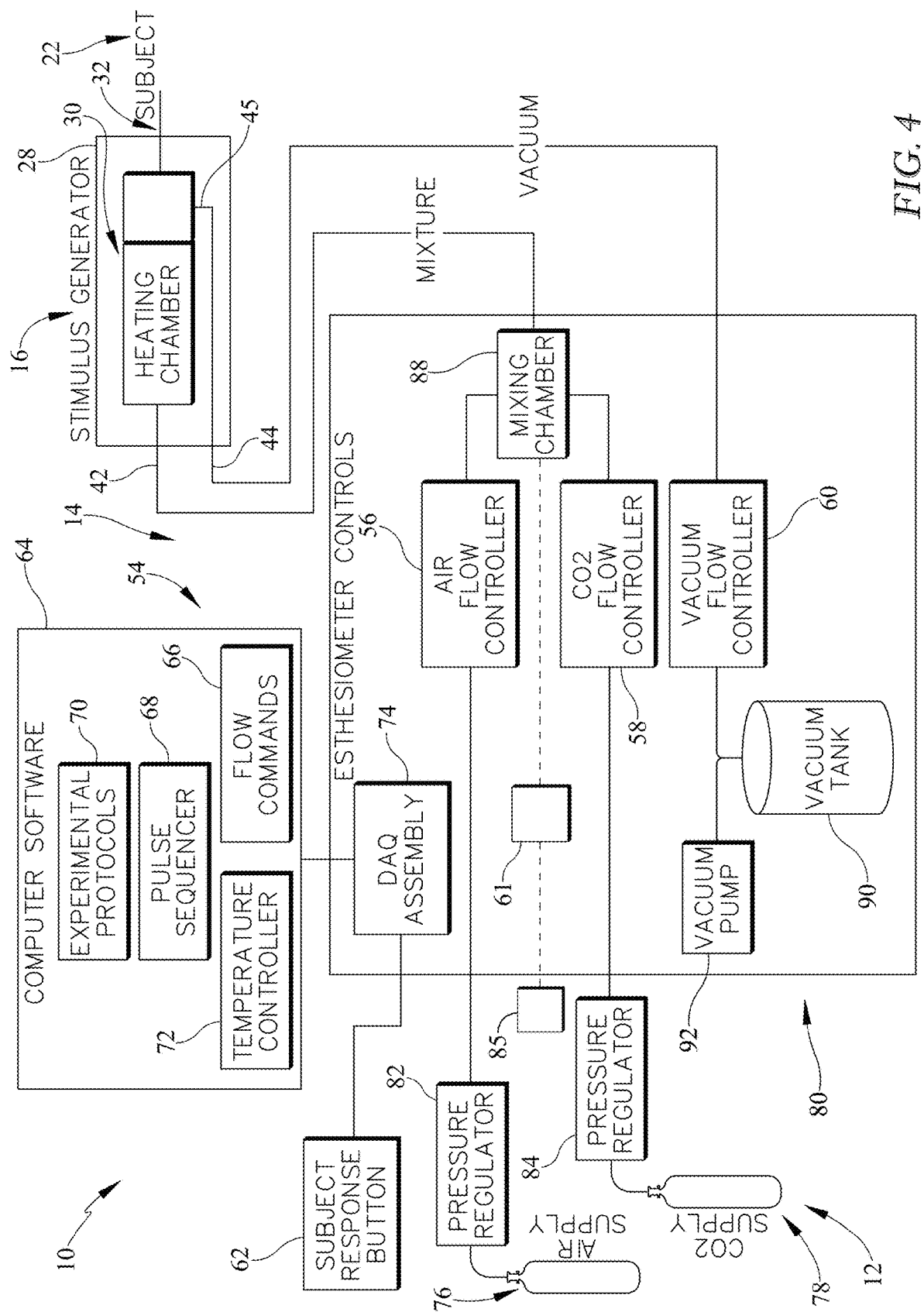
FIG. 4 is a diagrammatic view of the pneumatic esthesiometer of FIG. 1 showing the esthesiometer includes a pressurized gas source, a control system, and the pulse-conditioner.

In the illustrative embodiment, the vacuum assembly 80 includes a vacuum tank 90 and a vacuum pump 92 as shown in FIG. 4. The discharge outflow channel 44 may be in fluid communication with the vacuum tank 90. The vacuum pump 92 may be fluidly coupled to the outflow channel 44 and may be configured to remove to the accumulation of pressurized gas in the inflow channel 42 through the interconnecting channel 45 and out through the outflow channel 44. During the operation of the esthesiometer 10, the vacuum pump 92 maintains an approximately constant vacuum level in the vacuum tank 90.

The control system 14 includes a controller 54, a plurality of flow controllers 56, 58, 60, and a patient input device 62 as shown in FIGS. 2-4. The controller 54 is coupled to the flow controllers 56, 58, 60 and the patient input device 62 to control the parameters of the flow of pressurized gases 18. The flow controllers 56, 58, 60 are configured to regulate the gas mixture, the pulse duration, and the flow rate of the flow of pressurized gases 18 from the pressurized gas supply system 12. The patient input device 62 is configured to provide feedback from the patient eye 22 upon delivering the controlled-profile gas pulse 20 to the patient eye 22.

In the illustrative embodiments, the control system 14 also includes a power conditioner (not shown) that is coupled to the controller 54 and the pressurized gas supply system 12. The power supply is configured to convert the commercial electrical power supply to the voltages required by the esthesiometer control system 14.

The flow controllers 56, 58, 60 include an air flow controller 56, a $CO_2$ flow controller 58, and a vacuum flow controller 60 as shown in FIG. 4. The air flow controller 56 is coupled to the pressurized air supply 76 and is configured to control the amount of pressurized air provided from the pressurized air supply 76 to the mixing chamber 88. The $CO_2$ flow controller 58 is coupled to the $CO_2$ supply 78 and is configured to control the amount of $CO_2$ gas supplied from the $CO_2$ supply 78 to the mixing chamber 88. The vacuum flow controller 60 is coupled to the vacuum assembly 80 and is configured to control the evacuation of pressurized gas. In some embodiments, the control system 14 further includes a third flow controller 61 coupled to the third pressurized gas source 85 and configured to control the flow of third gas from the third pressurized gas source 85.

The controller 54 includes a set of instructions for the parameters of the flow of pressurized gases 18. The set of instructions are stored in a memory 64 included in the control system 14 as shown in FIG. 4. The set of instructions or sometimes referred to as the computer software, includes flow commands 66, pulse sequencer commands 68, and other diagnostic protocols 70. The instructions stored in the memory 64 are configured to direct the flow controllers 56, 58, 60 to open and close, thus controlling the gas mixture concentration, pulse duration, and flow rate of the flow of pressurized gases 18. In the illustrative embodiment, the set of instructions also includes temperature controls 72 as shown in FIG. 4.

To control the gas mixture concentration of the flow of pressurized gases 18, the controller 54 is configured to direct the flow controllers 56, 58 to open and close based on the desired mixture concentration for the controlled-profile gas pulse 20. The controller 54 directs the air flow controller 56 to open and provide the desired amount of pressurized air to the mixing chamber 88, while the controller 54 independently directs the CO2 flow controller 58 to open and provide the desired amount of CO2 to the mixing chamber 88. The pressurized air and CO2 mix together in the mixing chamber 88 before being supplied to the pulse-conditioner 16. In some embodiments, the controller 54 is also configured to selectively open and close the third flow controller 61 to vary the flow of third gas provided to the mixing chamber 88 so as to provide the desired mixture concentration of the flow of pressurized gases.

In the illustrative embodiment, the controlled-profile gas pulse 20 is a mixture of air and a desired concentration of CO2 gas that is different from that of ambient air. In other embodiments, the pressurized gas supply system 12 may include additional gas supplies for mixing more than two different gases to achieve the desired mixture. The additional supplies would be coupled to the mixing chamber and an additional flow controller would be configured to provide the desired amount of gas to the mixing chamber 88.

To control the pulse duration of the controlled-profile gas pulse 20, the controller 54 is configured to direct the vacuum pump 92 to turn on and the vacuum flow controller 60 to open and close based on the pulse sequencer commands. By opening the vacuum flow controller 60, the vacuum pump 92 suctions the flow of pressurized gases 18 out through the outflow channel 44, diverting the flow of pressurized gases 18 from being discharged out of the pulse-conditioner 16.

To deliver the controller-profile gas pulse 20, the controller 54 is configured to close the vacuum flow controller 60, diverting the flow of pressurized gases 18 from being suctioned out through the outflow channel 44 so that the flow of pressurized gases 18 is delivered to a nozzle 32 included in the pulse-conditioner 16. The nozzle 32 then directs the flow of pressurized gases 18 in the controlled-profile gas pulse 20 to the patient eye 22. The vacuum flow controller 60 is left closed for the duration of the pulse 20, and then opened to end the pulse 20.

The pulse sequencer commands include a range of pulse durations that may be varied from pulse 20 to pulse 20. The control system 14 is designed to provide pulse durations from 100 milliseconds to 10 seconds as selected by the operator. For some controlled-profile gas pulses 20, the duration of the controlled-profile gas pulse 20 may be between about 1 second and 5 seconds. For others, the duration of the controlled-profile gas pulse may be between about 1 second and 3 seconds. For some controlled-profile gas pulses 20, the duration of the controlled-profile gas pulse 20 may be greater than 100 milliseconds. For other controlled-profile gas pulses 20, the duration may be about 2 seconds.

The controller 54 is also configured to control the duration or delay between pulses 20 by directing the vacuum flow controller 60 to open and close based on the pulse sequencer commands. The pulse sequence commands include a range of pulse delays that may be varied from pulse 20 to pulse 20. For some controlled-profile gas pulses 20, the delay between pulses 20 may be about 2 seconds. For other controlled-profile gas pulses 20, the delay between pulses 20 may be between about 5 seconds and 30 seconds. For others, the delay may be between pulses 20 may be between about 5 seconds and 15 seconds. In the illustrative embodiments, the control system 14 permits the operator to configure the duration of delay as required.

Each of the flow controllers 56, 58, 60 includes a flow rate sensor, a variable orifice control valve, and feedback control electronics (not shown). The variable orifice control valve is configured to control the flow rate of the each flow based on the flow rate commands 66 of the controller 54. The flow sensors of each of the controllers 56, 58, 60 are configured to measure the flow rate through the control valve. The feedback control is configured to change the control valve based on the flow rate measured by the flow sensors to achieve the flow rate commanded by the controllers 56, 58, and 60.

The controller 54 is coupled to the flow controllers 56, 58, 60 to direct the flow controllers 56, 58, 60 to provide a flow with the desired flow rate based on the flow rate commands 66. The controller 54 is also configured to control the flow rate of the controlled-profile gas pulse 20 by directing the flow controller to output a desired flow rate.

The flow commands include a range of flow rates for the flow of pressurized gases 18 that may be varied from pulse 20 to pulse 20. For some controlled-profile gas pulses 20, the desired flow rate of the flow of pressurized gases 18 is between about 1 milliliter per minute and 200 milliliters per minute. The flow commands may be configured to direct the flow controllers 56, 58, 60 to set the flow rate of the flow of pressurized gases 18 anywhere between 1 milliliter per minute and 200 milliliters per minute depending on the test. In some embodiments, the flow commands may be configured to direct the flow controllers 56, 58, 60 to incrementally increase the flow rate with each subsequent controlled-profile gas pulse 20 unit the controlled-profile gas pulse 20 is detected by the patient eye 22.

In the illustrative embodiment, the control system 14 further includes a data acquisition assembly 74, or DAQ 74, as shown in FIG. 4. The DAQ 74 is coupled to the patient input device 62 and the memory 64 of the controller 54 to provide the controller 54 and the flow controllers 56, 58, and 60 and accept the patient response 62. The DAQ also processes the output of the temperature sensor arranged in the channel 50 to permit the controller 54 to control the heaters arranged in the channels 46 and 48.

In some embodiments, the control system 14 may further include a temperature sensor (not shown). The temperature sensor may be arranged in one of the channels 50 formed in the pulse-conditioner 16. The controller 54 may be coupled to the sensor and configured to receive the measurements taken by the sensor. The temperature controller 72 of the control system 14 may be configured to direct heating elements (not shown) arranged in the heater channels 46 and 48 of the pulse-conditioner 16 to increase the temperature of the flow of pressurized gases 18 based on the results or measurements form the sensor.

In the illustrative embodiment, the temperature controller 72 is configured to direct the heating elements in the pulse-conditioner 16 to heat the flow of pressurized gases 18 within a range of different temperatures. For some controlled-profile gas pulses 20, the desired temperature of the flow of pressurized gases 18 may be less than about 33 degrees Celsius, or about the temperature of the patient eye 22.

For other controlled-profile gas pulses 20, the desired temperature of the flow of pressurized gases 18 may be less than about 30 degrees Celsius. For some controlled-profile gas pulses 20, the desired temperature of the flow of pressurized gases 18 may be between about 20 degrees Celsius and about 25 degrees Celsius.

For some controlled-profile gas pulses 20, the flow of pressurized gases 18 may not be heated, i.e. the temperature controller 72 directs the heating elements in the pulse-condition 16 to not heat the flow of pressurized gases 18. In such embodiments, the desired temperature of the flow of pressurized gases 18 may be about room temperature.

In some embodiments, the memory 64 may be configured to store data specific to the patient eye 22 based on the response received by the patient input device 62 and create a set of instructions to be carried out based on that data. As such, the control system 14 may control the gas mixture concentration, the pulse duration, and the flow rate of each pulse 20 automatically based on the patient specific instructions, or the control system 14 may be manually controlled by directly setting the instructions at the beginning of each pulse 20.

Figure 19:
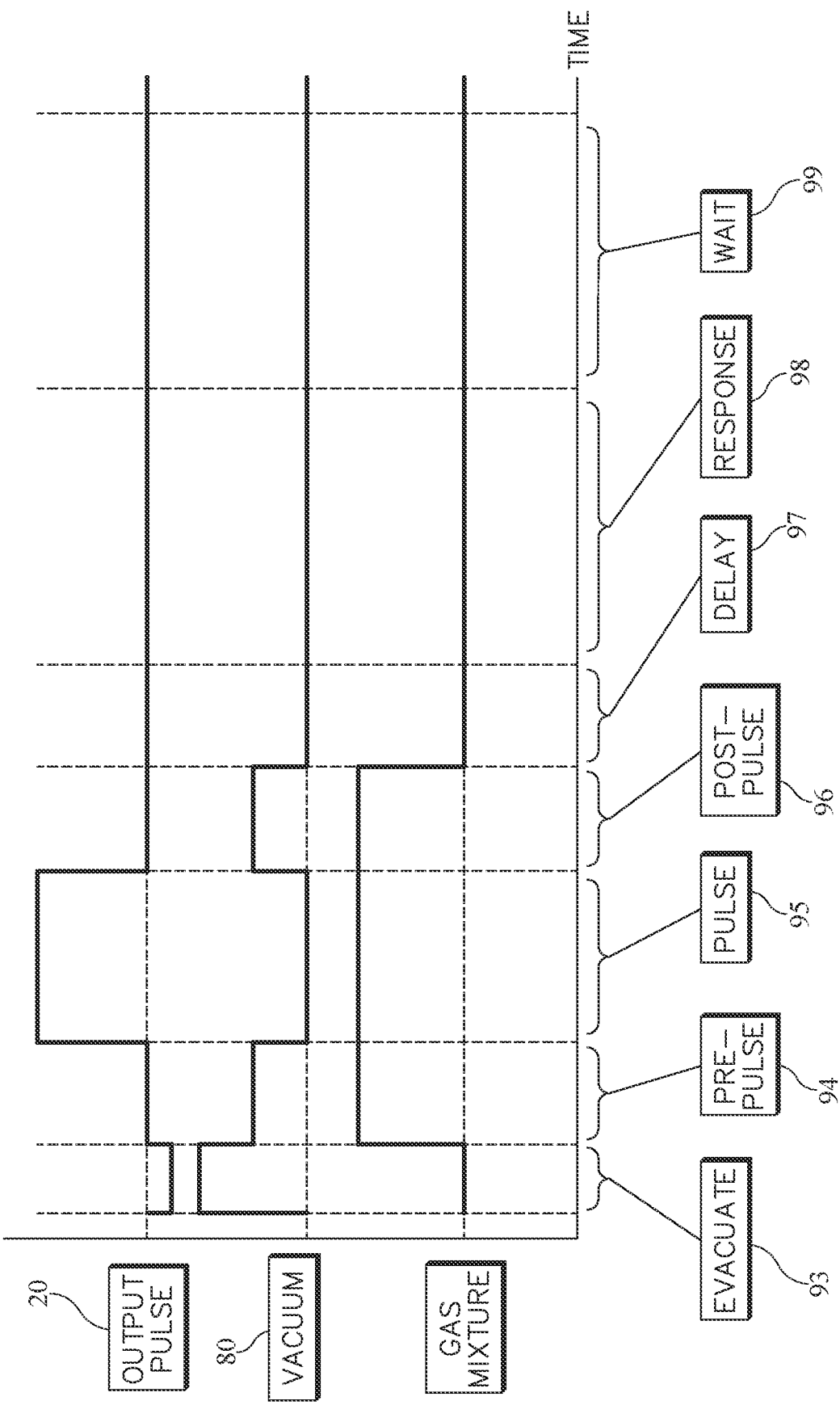
FIG. 19 is a diagrammatic view of the steps to generate the controlled-profile gas pulse using the pneumatic esthesiometer of FIG. 1.
Figure 20B:
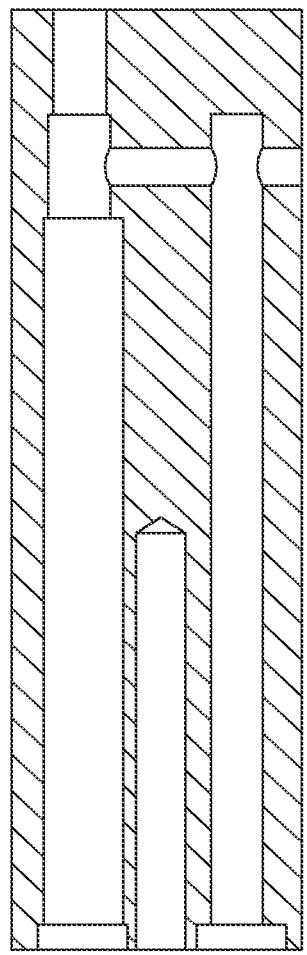
FIG. 20B is a cross-section view of the heater block included in the pulse conditioner of FIG. 13.
Figure 20D:
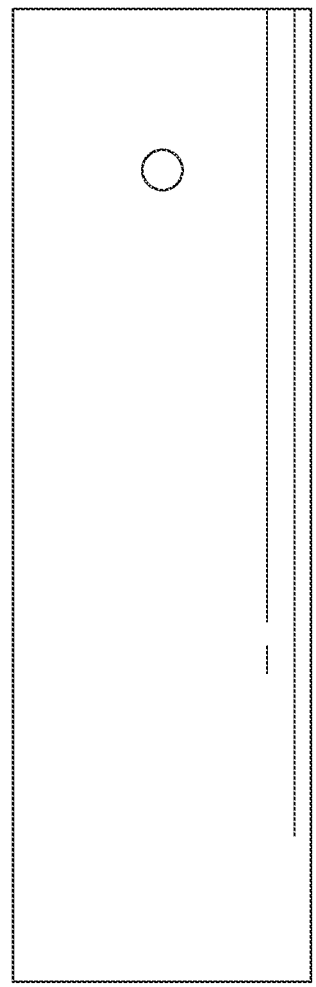
FIG. 20D is a bottom view of the heater block included in the pulse conditioner of FIG. 13.
Figure 20A:
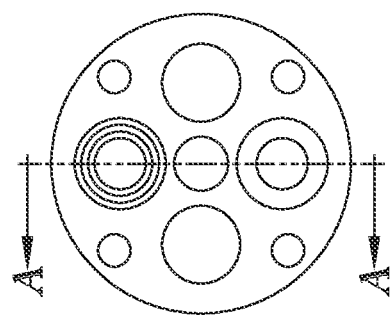
FIG. 20A is a frontal view of the heater block included in the pulse conditioner of FIG. 13.
Figure 20C:
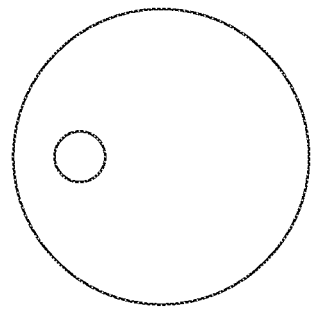
FIG. 20C is a back view of the heater block included in the pulse conditioner of FIG. 13.

The process of generating the controlled-profile gas pulse 20 using the pneumatic esthesiometer 10 to test the sensitivity of the patient eye 22 may include several steps as shown in FIG. 19. In the illustrative embodiment, to generate the pulse 20 using the esthesiometer 10, the control system 54 commands the vacuum flow controller 60 to open to a predetermined flow value causing any gas from a previous pulse 20 and/or ambient air from the pulse-conditioner 16 to flow to the vacuum tank 90.

After the evacuation time 93, the control system 54 commands the flow controllers 56 and 58 to open as required to deliver the specified gas mixture as shown in FIG. 19. During the pre-pulse interval, the flow of pressurized gases 18 flows through the mixing chamber 88, the pulse heater 30, and back to the vacuum tank 90 through the vacuum port 45.

After the pre-pulse interval 94, the vacuum flow is shut off (i.e. the control system 54 commands the vacuum flow controller 60 to zero flow) and the gas mixture flow 18 is diverted from the vacuum port 45 to the pulse-conditioner 16 as shown in FIG. 19 As a result, the controlled-profile gas pulse 20 with the desired gas mixture reaches the patent eye 22. After the programmed pulse interval 95, the vacuum 92 is again turned on for the post pulse interval 96 and the gas mixture 18 again flows to the vacuum tank 90 ending the pulse 20.

Following each pulse 20 there is an opportunity for the patient to respond using the patient response button 62 as shown in FIG. 19. To begin, there is a brief delay interval 97 which allows the patient to recover from the pulse 20, followed by a response interval 98 during which the control system 54 accepts the input from the patient response button 62. The response interval 98 is followed by a wait period 99 to let the patient prepare for the next pulse 20. Each of these time intervals may be set by the operator as desired for the particular diagnostic protocol in use.

The result of the patient response button 62 may be used to select the value of one of the controlled pulse parameters, intensity, duration, or mixture for the following pulse according to one of the protocols programmed into the control system 54 as selected by the operator. Alternately, the operator may set any of the pulse parameters to desired values and trigger the following pulse manually. Since in the illustrative embodiment the control system 54 is implemented in a general purpose personal computer, patient's response as well as the pulse parameters may be recorded and stored.

Turning again to the pulse-conditioner, the pulse-conditioner 16 includes a housing 28, a pulse heater 30, and the nozzle 32 as shown in FIGS. 2-4 and 7-11. The pulse heater 30 is arranged within the housing 28 and is configured to heat the flow of pressurized gases 18 to a temperature greater than atmospheric temperature. The nozzle 32 is in fluid communication with the pulse heater 30 and is configured to direct the flow of pressurized gases 18 in the controlled-profile gas pulse 20.

Figure 5A:
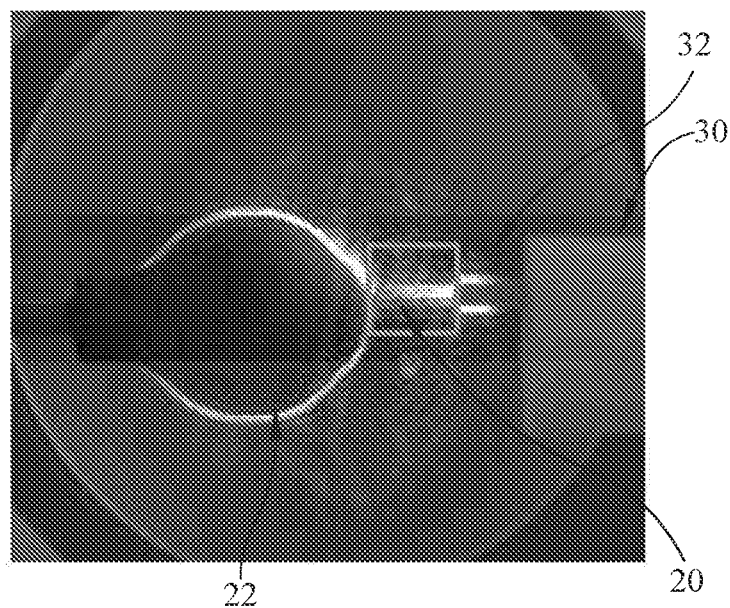
FIG. 5A is an elevation view of the controlled-profile gas pulse of FIG. 3 showing the controlled-profile gas pulse stimulating the patient eye.
Figure 6A:
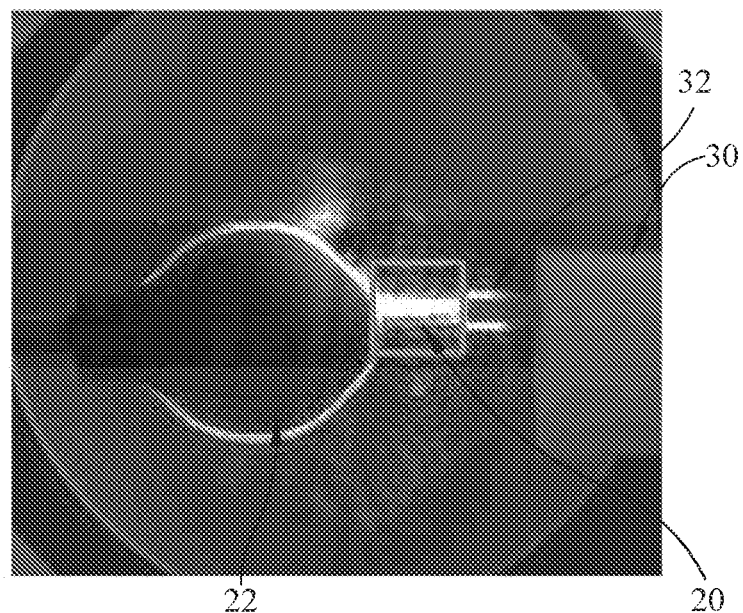
FIG. 6A is an elevation view similar to FIG. 5 showing the controlled-profile gas pulse stimulating the patient eye.

In the illustrative embodiment, the nozzle 32 helps shape the controlled-profile gas pulse 20 over the predefined distance D. As a result, the controlled-profile gas pulse 20 discharged by the nozzle 32 delivers a smooth, columnar flow. The smooth, columnar flow forms the substantially cylindrical shape 24 of the controlled-profile gas pulse 20 as shown in FIGS. 5A and 6A, which increases the repeatability and accuracy of the controlled-profile gas pulse 20 administered to the patient eye 22.

Figure 5B:
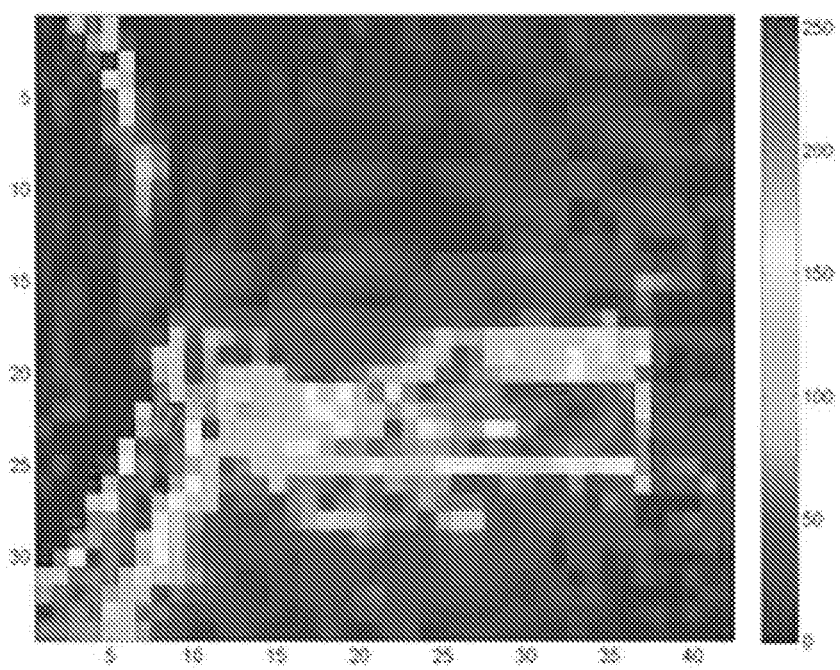
FIG. 5B is a diagram of the controlled-profile gas pulse of FIG. 5 showing the relative pixel intensity of the controlled-profile gas pulse.
Figure 6B:
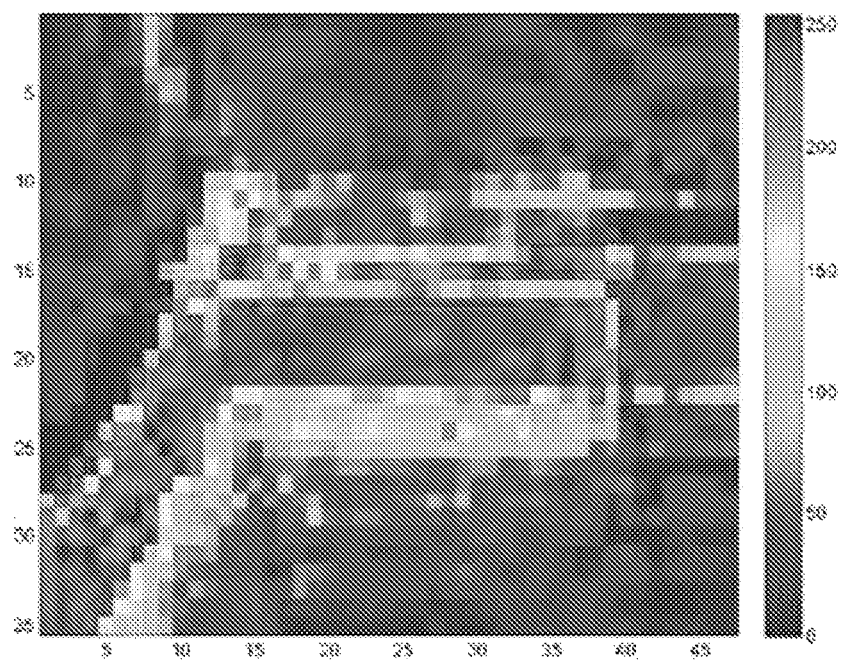
FIG. 6B is a diagram of the controlled-profile gas pulse of FIG. 6 showing the relative pixel intensity of the controlled-profile gas pulse.

The relative pixel intensity of the controlled-profile gas pulse 20 is shown in FIGS. 5B and 6B. The relative pixel intensity as shown in FIGS. 5B and 6B shows the substantially cylindrical shape 24 of the controlled-profile gas pulse 20 for the predefined distance D.

In illustrative embodiment, the distance D may be about, or precisely, 5 millimeters from the patient eye 22. In other embodiments, the distance D may be between about, or precisely, 1 millimeter and about, or precisely, 10 millimeters from the patient eye 22. In some embodiments, the distance D may be between about, or precisely, 4 millimeters and about, or precisely, 6 millimeters.

Figure 14:
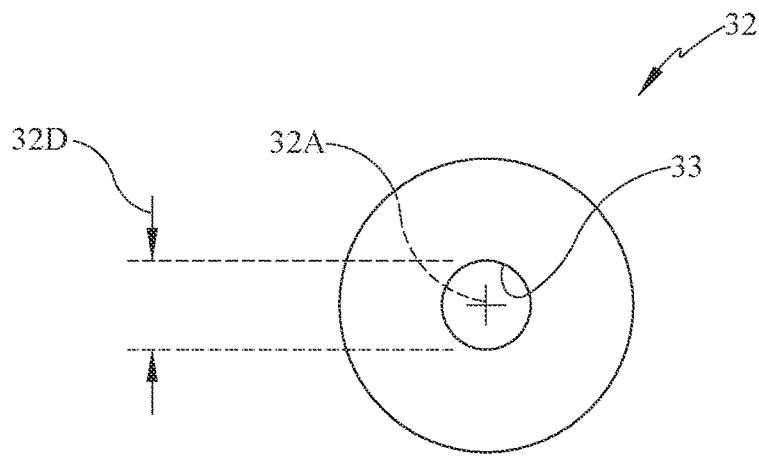
FIG. 14 is a front view of the nozzle included in the pulse-conditioner of FIG. 3 showing the nozzle has a preselected inner diameter.
Figure 15:
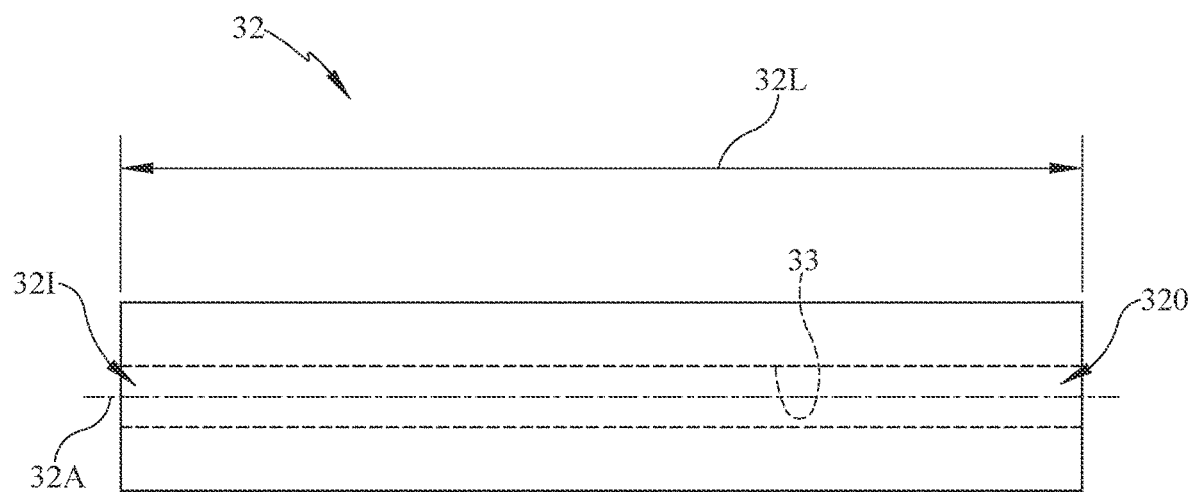
FIG. 15 is an cross-section view of the nozzle of FIG. 14 showing the nozzle includes an inlet and an outlet spaced apart axially a predetermined length from the inlet relative to the axis to define a flow path surface therebetween.

The nozzle 32 is cylindrical in shape and is formed to include an inlet 321 and an outlet 320, as shown in FIGS. 14 and 15. The inlet 321 is in fluid communication with the flow of pressurized gases 18. The outlet 320 is spaced apart axially from the inlet 321 relative to an axis 32A to define a flow path surface 33 that extends between the inlet 321 and the outlet 320. In the illustrative embodiment, the flow path surface 33 is cylindrical in shape and extends axially between the inlet 321 and the outlet 320 of the nozzle 32.

Figure 9:
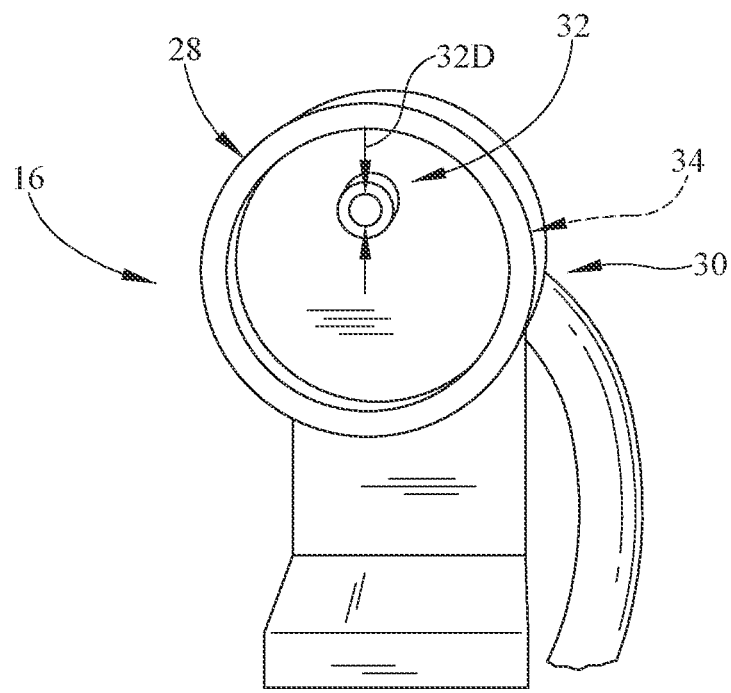
FIG. 9 is a frontal view of the pulse-conditioner of FIG. 3.
Figure 10:
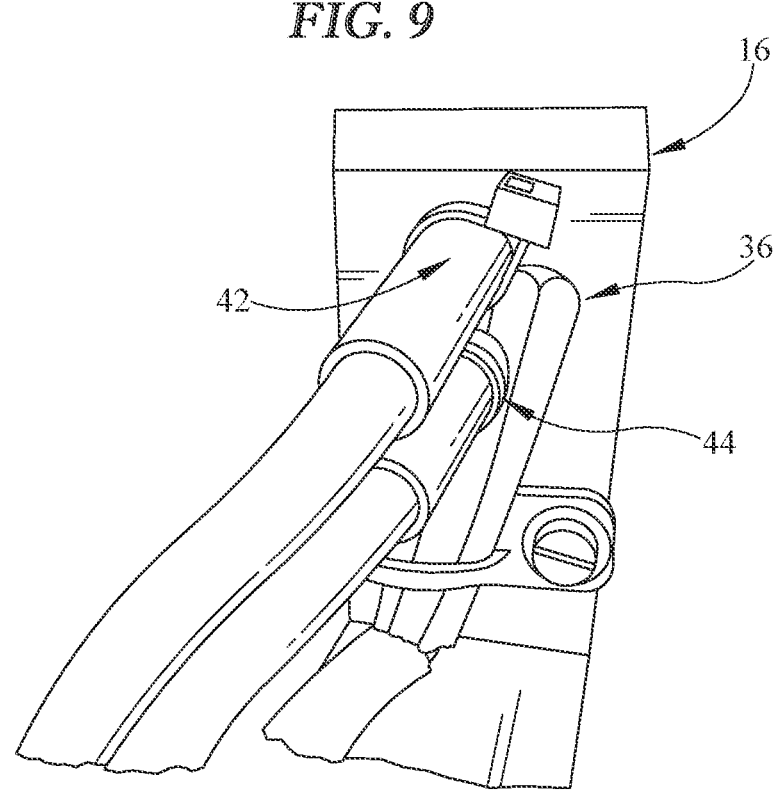
FIG. 10 is a back view of the pulse-conditioner of FIG. 3.
Figure 11:
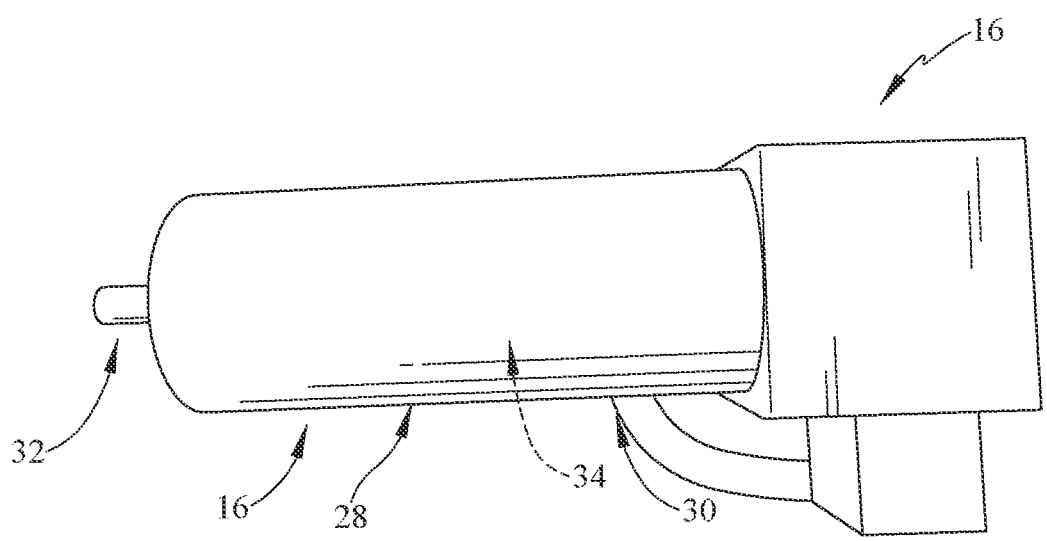
FIG. 11 is top view of the pulse-conditioner of FIG. 3.
Figure 12:
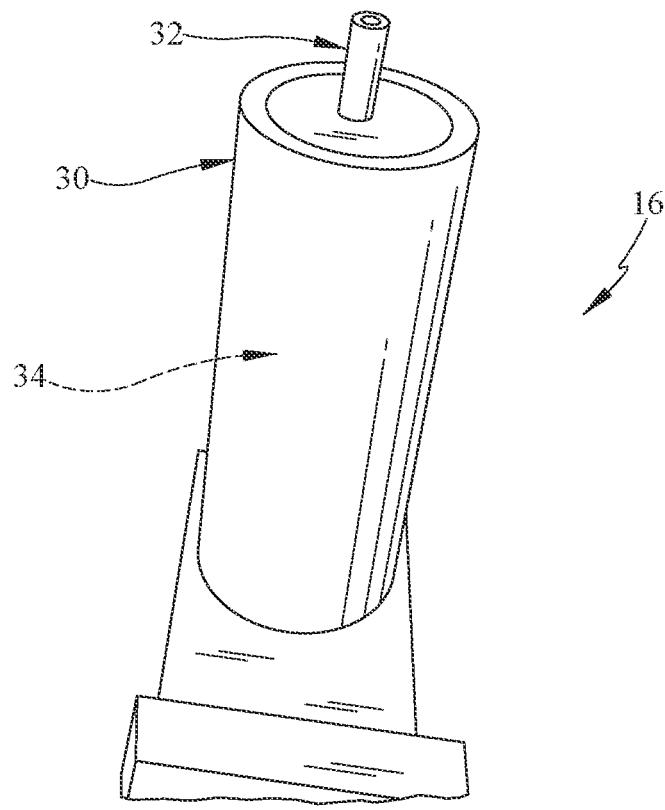
FIG. 12 is a bottom view of the pulse-conditioner of FIG. 3.

The outlet 320 has a predefined inner diameter 32D as shown in FIGS. 3, 9, and 14. The inner diameter 32D of the nozzle outlet 320 may be sized so that the controlled-profile gas pulse 20 has the cylindrical shape 24 over the predetermined distance D. The desired diameter 32D may also be optimized so that the controlled-profile gas pulse 20 stimulates the patient eye 22 at a selected diameter that is effective to stimulate a patient eye at the predefined distance D, meaning the controlled-profile gas pulse 20 stimulates or contacts the target portion 26 of the patient eye 22 over the selected diameter.

In the some embodiments, the diameter 32D of the nozzle 32 is about 1 millimeters and about 2 millimeters. In other embodiments, the selected diameter may be about 1.5 millimeters to about 1.75 millimeters. In the illustrative embodiment, the selected diameter may be about 1.6 millimeters.

In the illustrative embodiment, the inlet 321 and the outlet 320 have the same diameter 32D as shown in FIG. 15. The outlet 320 is spaced apart axially from the inlet 321 to define a length 32L of the nozzle 32. The flow path surface 33 extends axially between the inlet 321 and the outlet 320 along the axis 32A for the entire length 32L of the nozzle 32. The flow path surface 33 is constant along a length 32L of the nozzle 32 in the illustrative embodiment.

The length 32L of the nozzle 32 is about 16 millimeters in some embodiments. In other embodiments, the length 32L of the nozzle 32 may be between about 15 millimeters and 17 millimeters. In other embodiments, the length 32L may be about 15.5 millimeters. In the illustrative embodiment, the length 32L of the nozzle 32 is about 15.8 millimeters.

In some embodiments, the selected diameter of the target portion 26 on the patient eye 22 that the controlled-profile gas pulse 20 stimulates may be between about 1 millimeters and about 2 millimeters. In other embodiments, the selected diameter may be about 1.5 millimeters to about 1.75 millimeters. In the illustrative embodiment, the selected diameter may be about 1.6 millimeters.

The pulse heater 30 includes a heater block 34 and a rod 40 as shown in FIGS. 3 and 7-11. The heater block 34 is shaped to define a plurality of channels 42, 44, 45, 46, 48, 50. The channels 42, 44 are in fluid communication with the pressurized gas supply system 12 and the nozzle 32. The rod 40 is arranged within another channel 42 of the plurality of channels 42, 44, 45, 46, 48, 50 formed in the heater block 34 so as elongate the path of the flow of pressurized gases 18. The elongated flow path created by the rod 40 ensures the flow of pressurized gases 18 comes to temperature and helps maintain the desired temperature along the channel 42 and at the ocular surface 22.

In the illustrative embodiment, the other channels 46, 48 formed in the pulse heater 30 are sized to receive the heating elements and channel 50 is sized to receive a temperature sensor. The heating elements arranged in the channels 46, 48 are configured to heat the heater block 34, which in turn heats the flow of pressurized gases 18 flowing through the channels 42, 44.

In some embodiments, the pulse heater 30 may include at least two heating elements. Each heating element may be arranged in one channel 46, 48 of the heater block 34.

Figure 7:
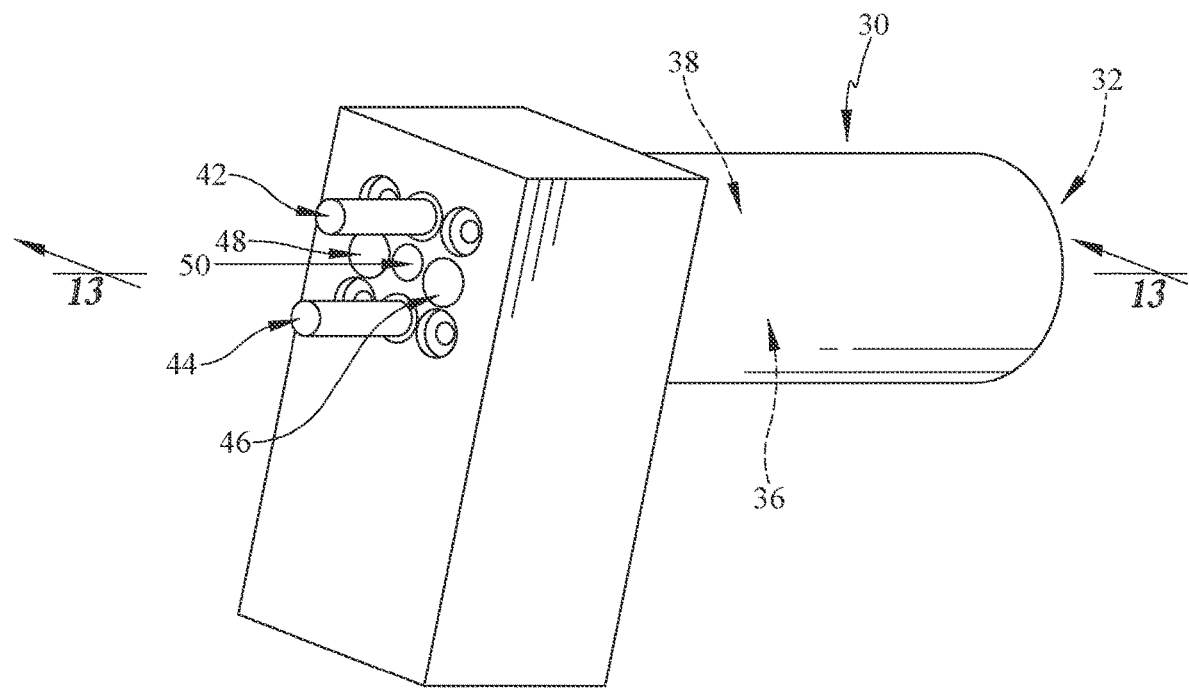
FIG. 7 is perspective view of the pulse-conditioner of FIG. 3.
Figure 8:
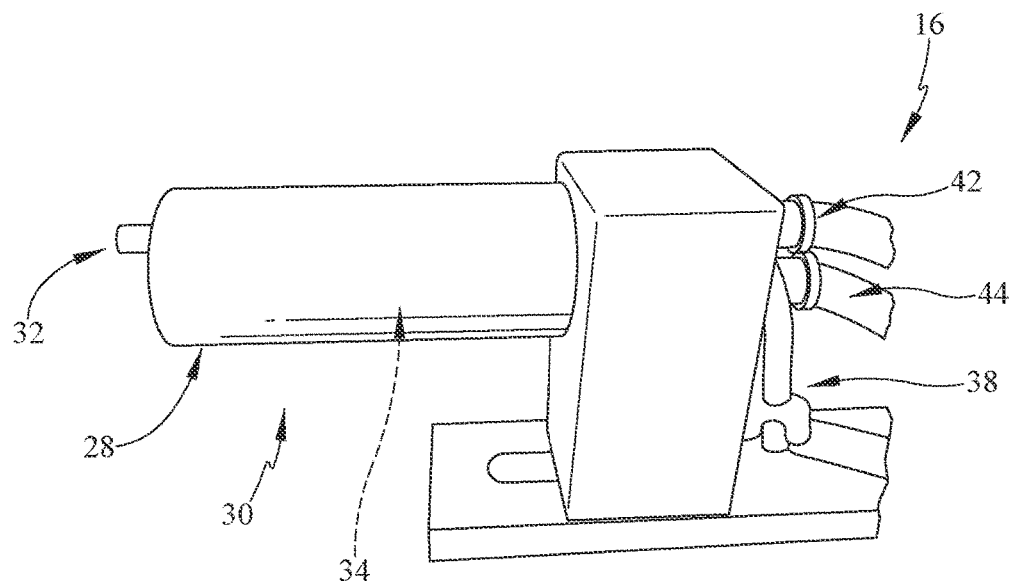
FIG. 8 is an elevation view of the pulse-conditioner of FIG. 3.

The plurality of channels 42, 44, 45, 46, 48, 50 include the inflow channel 42, the discharge outflow channel 44, an interconnecting channel 45, at least one heater channel 46, 48, and a sensor channel 50 as shown in FIGS. 3 and 7. The inflow channel 42 is in fluid communication with the pressurized gas supply system 12 to receive the flow of pressurized gases 18 and the nozzle 32. The outflow channel 44 is fluidly coupled to the inflow channel 42 and the vacuum assembly 80 so as to remove the accumulation of pressurized gas in the inflow channel 42. The interconnecting channel 45 extends between the inflow and outflow channels 42, 44 to fluidly connect the inlet and outflow channels 42, 44. The interconnecting channel 45 extends between the inflow and outflow channels 42, 44 before the nozzle 32 so as to divert the flow of pressurized gases 18 from being supplied to the nozzle 32 when the vacuum assembly 80 is turned on.

The heater channel 46 is configured to receive heating elements. In the illustrative embodiment, the plurality of channels includes at least two heater channels 46, 48 to each receive the heating elements. The sensor channel 50 is configured to receive a temperature sensor included in the control system 14.

Figure 18:
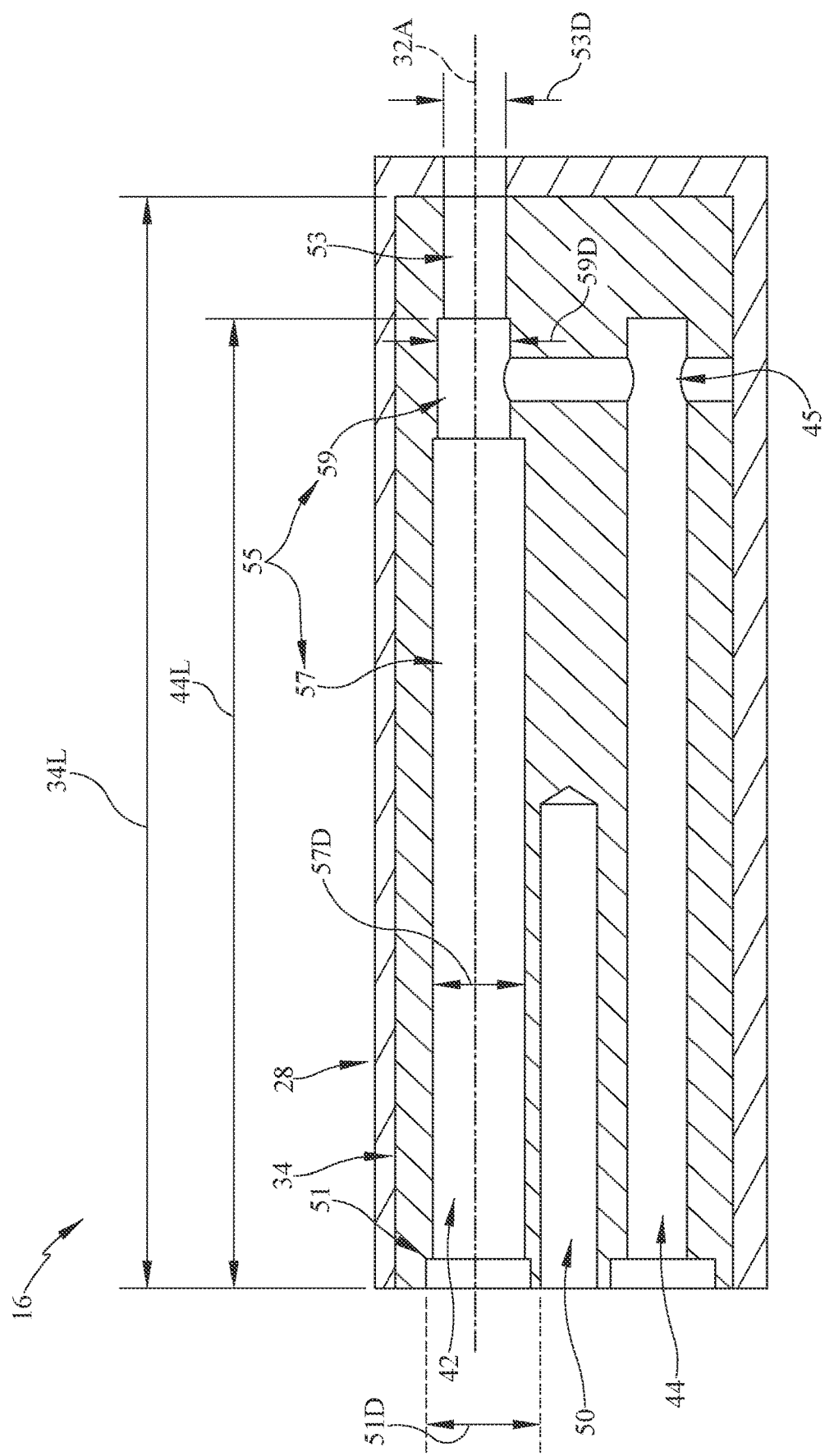
FIG. 18 is a cross-section detail view of the pulse-conditioner of FIG. 13 showing the inflow channel is a multi-stepped channel with the stepped portions having different diameters and the outflow channel is fluidly coupled to the inflow channel by a interconnecting channel.

In the illustrative embodiment, the heater block 34 has an overall length 34L as shown in FIG. 18. The inflow channel 42 extends the overall length 34L of the heater block 34, while the outflow channel 44 extends partway into the heater block 34. In the illustrative embodiment, the inflow channel 42 is a multi-stepped channel with the stepped portions having different diameters 51D, 53D, 57D, 59D. In this way, the diameter of the channel 42 decreases axially along the length 34L of the channel 42 relative to the axis 32A.

The stepped inflow channel 42 includes an inlet portion 51, an outlet portion 53, and a middle portion 55 as shown in FIG. 18. The inlet portion 51 forms an inlet opening of the inflow channel 42 and has an inlet diameter 51D. The outlet portion 53 forms an outlet opening of the inflow channel 42. The outlet portion 53 has an outlet diameter 53D that is less than the inlet diameter 51D. The middle portion 55 extends between the inlet portion 51 and the outlet portion 53.

Figure 16:
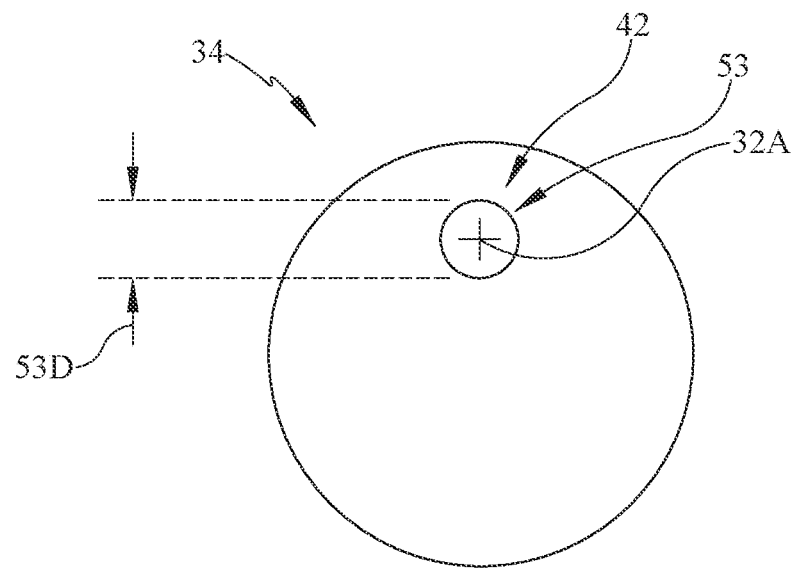
FIG. 16 is a frontal view of the heater block included in the pulse conditioner of FIG. 13 showing the inflow channel of the plurality of channel extends through the heater block to provide an outlet opening to receive the nozzle included in the pulse-conditioner
Figure 17:
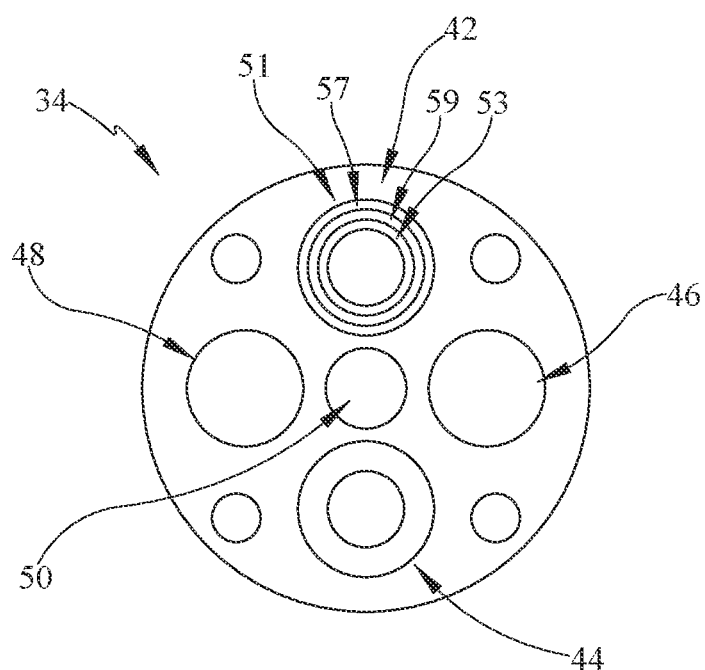
FIG. 17 is a back view of the heater block included in the pulse-conditioner of FIG. 13 showing the plurality of channels in the heater block includes the inflow channel in fluid communication with the pressurized gas source to receive the flow of pressurized gas, an outflow channel configured to remove the accumulation of pressurized gas in the inflow channel, heater channels configured to receive a heating elements, and a sensor channel configured to receive a sensor for measuring the temperature of the flow of pressurized gas.

In the illustrative embodiment, the outlet diameter 53D of the outlet portion 53 is sized so as to receive a portion of the nozzle 32 as shown in FIGS. 16 and 18. The nozzle 32 is press fit into the outlet portion 53 of the channel 42. In this way, an outer surface 35 of the nozzle 32 forms an outer diameter that is equal to the outlet diameter 53D of the channel 42. In some embodiments, the outer surface 35 of the nozzle 32 may mate with the surface forming the outlet portion 53 of the channel 42.

The middle portion 55 has a heating section 57 and a connecting section 59 as shown in FIG. 18. The heating section 57 has a diameter 57D that is sized to receive the rod 40. The diameter 57D of the heating section 57 is less than the inlet diameter 51D and greater than the outlet diameter 53D. The connecting section 59 extends from the heating section 57 to the outlet portion 53 of the inflow channel 42. The connecting section 59 has a diameter 59D that is less than the diameter 57D of the heating section 57 and greater than the outlet diameter 53D. In the illustrative embodiment, the interconnecting channel 45 extends between the connecting section 59 of the inflow channel 42 and the outflow channel 44.

In the some embodiments, the inlet diameter 51D is about 5 millimeters. In other embodiments, the inlet diameter 51D is between about 5 millimeters and about 6 millimeters. In the illustrative embodiment, the inlet diameter 51D is about 5.3 millimeters.

In some embodiments, the outlet diameter 53D is about 3 millimeters. In other embodiments, the outlet diameter 53D is between about 3 millimeters and 3.5 millimeters. In the illustrative embodiment, the outlet diameter is about 3.1 millimeters.

In some embodiments, the diameter 57D of the heating section 57 is about 4.5 millimeters. In other embodiments, the diameter 57D of the heating section 57 is between about 4 millimeters and 4.8 millimeters. In the illustrative embodiment, the diameter 57D of the heating section 57 is about 4.7 millimeters.

The threaded rod 40 is arranged within inflow channel 42 as shown in FIGS. 3 and 13. The rod 40 is shaped to include a plurality of threads that create a spiral shape elongating the flow path of the flow of pressurized gases 18. The rod 40 is press fit into the inflow channel 42 and forces the flow of pressurized gases 18 to follow the elongated path, which allows the pulse heater 30 more time to heat the flow of pressurized gases 18 to the desired temperature. The rod 40 ensures that the controlled-profile gas pulse 20 is the desired temperature once discharged from the nozzle 32.

In the illustrative embodiment, the rod 40 is arranged in the heating section 57 of the inflow channel 42. The rod 40 is press fit into the heating section 57 of the inflow channel 42 so that one end of the rod 40 is adjacent to the connecting section 59 in the illustrative embodiment.

The rod 40 extends only partway in the heating section 57 of the inflow channel 42 in the illustrative embodiments. As such, the heating section 57 of the channel 42 may have the same length of the rod 40 in some embodiments. In other embodiments, the heating section 57 may extend a length that is longer than the length of the rod 40.

The heater block 34 has an overall length 34L of about 67 millimeters in the some embodiments. In other embodiments, the overall length 34L of the heater block 34 is between about 65 millimeters and about 70 millimeters. In the illustrative embodiment, the length 34L of the heater block 34 is about 67. The inflow channel 42 extends the length 34L of the heater block 34.

The outflow channel 44 extends partway into the heater block 34 as shown in FIGS. 3, 13, and 18. The outflow channel has a length 44L. In the illustrative embodiment, the length 44L of the outflow channel 44 is about 50 millimeters. In other embodiments, the length 44L of the outflow channel 44 may be between 45 and 55 millimeters.

In the illustrative embodiment, the pneumatic esthesiometer 10 further includes a mount block 17 as shown in FIGS. 7 and 14. The mount block 17 is configured to mount the pulse-conditioner 16 in place relative to the patient eye 22 so that the nozzle 32 is positioned at the predetermined distance D from the target portion 26 of the patient eye 22.

The present disclosure relates generally to neurosensory testing devices, and more specifically to devices for measuring sensitivity and sensations of a patient eye. Neurosensory testing to determine the sensitivity and sensations of a patient eye may sometimes require stimulating the patient eye to prompt a patient response. Specifically, the present disclosure relates to neurosensory testing in dry eye patients, including those with contact lenses associated dry eye.

In ocular surface neurosensory tests, such as corneal sensitivity testing, a stimulus may be provided to the patient eye 22 to cause a patient response. The stimulus is used to assess or test neurosensory function of the patient eye 22. In some embodiments, the stimulus is a flow of pressurized gases 18 directed at the target portion 26 of the patient eye 22.

Pneumatic esthesiometers have been used to deliver the stimulus to patient eyes during such testing. However, the flow of pressurized gas may dissipate as the flow moves toward the patient eye 22 forming a cone shape that may contact a larger area on the patient eye 22 than desired. Such stimuli delivered by commonly used esthesiometers therefore do not accurately and repeatably targeted a specific target area of the patient eye, leading to the need for a device to address this need. As a result, the present application teaches the pneumatic esthesiometer 10 that discharges the flow of pressurized gases 18 in the controlled-profile gas pulse 20 to allow repeatable and accurate targeting of the specific target portion 26 of the patient eye 22 providing reliable results.

Neurosensory abnormalities may be tested by delivering a controlled stimulus to the front of the eye 22 with an instrument known as a pneumatic esthesiometer and testing the patient's response. This method has been implemented to access neurosensory function in dry eye patients, including those with contact lenses associated dry eye. This method may also provide a link for connecting symptoms and clinical signs of the condition. In other embodiments, the method and the esthesiometer 10 may be used in other neurosensory testing.

The present disclosure teaches a controlled pneumatic esthesiometer 10 with a pulse-conditioner 16 that may significantly improve the performance and test-retest repeatability of esthesiometers. Neurosensory testing instruments may have practical utility as a monitoring test that may be used for dry eye therapeutic drug development. Such corneal neurosensory testing instruments may also allow eye care practitioners to evaluate the effectiveness of therapy for dry eye disease.

The pneumatic esthesiometer 10 may be a useful tool for pharmaceutical companies in the development of more effective dry eye therapeutics for improving neurosensory function. The esthesiometer 10 may also allow improved monitoring and assessment of dry eye treatment by eye care professionals.

The esthesiometer 10 includes a pulse-conditioner 16 including a pulse heater 30 and nozzle 32. The nozzle 32 directs a flow of pressurized gases 18 in the controlled-profile gas pulse 20. The controlled-profile gas pulse 20 travels through a more collimated pathway in the nozzle 32 to form a straighter and more localized pulse delivered to the patient eye 22. The controlled-profile gas pulse 20 has a substantially cylindrical shape compared to the more spread out shape of the pulse of previous esthesiometers.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A pneumatic esthesiometer adapted to measure tactile sensation of a patient eye, the esthesiometer comprising a pressurized gas supply system including at least two pressurized gas sources configured to provide a flow of pressurized gases and a mixing chamber coupled to the at least two pressurized gas sources to receive a flow of first gas from a first pressurized gas source included in the at least two pressurized gas sources and a flow of second gas from a second pressurized gas source included in the at least two pressurized gas sources that is different from the first pressurized gas source, a control system coupled to the at least two pressurized gas sources, the control system including a first flow controller coupled to the first pressurized gas source and configured to control the flow of first gas, a second flow controller coupled to the second pressurized gas source and configured to control the flow of second gas, and a controller coupled to the first flow controller and the second flow controller, a pulse-conditioner coupled to the at least two pressurized gas sources to receive the flow of pressurized gases and configured to discharge the flow of pressurized gases in a controlled-profile gas pulse that has a cylindrical shape through the atmosphere over a predefined distance between an outlet of the pulse-conditioner and the patient eye so as to repeatedly apply the controlled-profile gas pulse to a target portion of the patient eye and achieve repeatable response related to sensation felt by a patient, wherein the controller is configured to selectively open and close the first and second flow controllers to vary the flow of first gas and the flow of second gas so as to provide a desired mixture concentration of the flow of pressurized gases, wherein the pulse-conditioner includes a housing, a pulse heater arranged within the housing and configured to heat the flow of pressurized gases to a temperature greater than atmospheric temperature, and a nozzle in fluid communication with the pulse heater and configured to direct the controlled-profile gas pulse, and wherein the pulse heater includes a heater block shaped to define an inflow channel to receive the flow of pressurized gases with the desired mixture concentration and a rod arranged within the inflow channel to elongate a flow path of the flow of pressurized gases through the inflow channel.

2. The esthesiometer of claim 1, wherein the pressurized gas supply system further includes a vacuum pump coupled to the pulse-conditioner and configured to vacuum out existing gas in the pulse-conditioner.

3. The esthesiometer of claim 2, wherein the control system further includes a vacuum flow controller coupled to the vacuum pump of the pressurized gas supply system and the controller is configured to selectively open and close the vacuum flow controller to vary a pulse duration of the controlled-profile gas pulse.

4. The esthesiometer of claim 1, wherein the first pressurized gas source of the at least two pressurized gas sources is medical grade compressed air and the second pressurized gas source is carbon-dioxide gas, and wherein the desired mixture concentration of the flow of pressurized gases has a concentration of carbon-dioxide gas that is different than that of ambient air.

5. The esthesiometer of claim 1, wherein the at least two pressurized gas sources of the pressurized gas supply system further includes a third pressurized gas source coupled to the mixing chamber to provide a flow of third gas to the mixing chamber, and wherein the control system further includes a third flow controller coupled to the third pressurized gas source and configured to control the flow of third gas from the third pressurized gas source.

6. The esthesiometer of claim 5, wherein the controller is configured to selectively open and close the third flow controller to vary the flow of third gas provided to the mixing chamber so as to provide the desired mixture concentration of the flow of pressurized gases.

7. A pneumatic esthesiometer adapted to measure tactile sensation of a patient eye, the esthesiometer comprising a pressurized gas supply system including at least two pressurized gas sources configured to provide a flow of pressurized gases and a mixing chamber coupled to the at least two pressurized gas sources to receive a flow of first gas from a first pressurized gas source included in the at least two pressurized gas sources and a flow of second gas from a second pressurized gas source included in the at least two pressurized gas sources that is different from the first pressurized gas source,
  a control system coupled to the at least two pressurized gas sources, the control system including a first flow controller coupled to the first pressurized gas source and configured to control the flow of first gas, a second flow controller coupled to the second pressurized gas source and configured to control the flow of second gas, and a controller coupled to the first flow controller and the second flow controller,
  a pulse-conditioner coupled to the at least two pressurized gas sources to receive the flow of pressurized gases and configured to discharge the flow of pressurized gases in a controlled-profile gas pulse that has a cylindrical shape through the atmosphere over a predefined distance between an outlet of the pulse-conditioner and the patient eye so as to repeatedly apply the controlled-profile gas pulse to a target portion of the patient eye and achieve repeatable response related to sensation felt by a patient,
  wherein the controller is configured to selectively open and close the first and second flow controllers to vary the flow of first gas and the flow of second gas so as to provide a desired mixture concentration of the flow of pressurized gases,
  wherein the pressurized gas supply system further includes a vacuum pump coupled to the pulse-conditioner and configured to vacuum out existing gas in the pulse-conditioner, and
  wherein the pulse-conditioner includes an inflow channel fluidly coupled to the mixing chamber of the pressurized gas supply system to receive the flow of pressurized gases with the desired mixture concentration and an outflow channel fluidly coupled to the vacuum pump.

8. The esthesiometer of claim 7, wherein the control system further includes a vacuum flow controller coupled between the outflow channel and the vacuum pump of the pressurized gas supply system and the controller is configured to selectively open and close the vacuum flow controller to vary a pulse duration of the controlled-profile gas pulse.

9. The esthesiometer of claim 7, wherein the pulse-conditioner includes a housing, a pulse heater arranged within the housing and configured to heat the flow of pressurized gases to a temperature greater than atmospheric temperature, and a nozzle in fluid communication with the pulse heater and configured to direct the controlled-profile gas pulse.

10. The esthesiometer of claim 9, wherein the pulse heater includes a heater block shaped to define the inflow channel to receive the flow of pressurized gases with the desired mixture concentration and the outflow channel fluidly coupled to the vacuum pump and a rod arranged within the inflow channel to elongate a flow path of the flow of pressurized gases through the inflow channel.

11. The esthesiometer of claim 7, wherein the first pressurized gas source of the at least two pressurized gas sources is medical grade compressed air and the second pressurized gas source is carbon-dioxide gas, and wherein the desired mixture concentration of the flow of pressurized gases has a concentration of carbon-dioxide gas that is different than that of ambient air.

12. The esthesiometer of claim 7, wherein the at least two pressurized gas sources of the pressurized gas supply system further includes a third pressurized gas source coupled to the mixing chamber to provide a flow of third gas to the mixing chamber, and wherein the control system further includes a third flow controller coupled to the third pressurized gas source and configured to control the flow of third gas from the third pressurized gas source.

13. The esthesiometer of claim 12, wherein the controller is configured to selectively open and close the third flow controller to vary the flow of third gas provided to the mixing chamber so as to provide the desired mixture concentration of the flow of pressurized gases.

14. A method to determine patient ocular sensitivity using a pneumatic esthesiometer, the method comprising
  providing a pressurized gas supply system configured to provide a flow of pressurized gases, the pressurized gas supply system including a first gas supply, a second gas supply that is different than the first gas supply, and a vacuum pump,
  providing a control system configured to control the flow of pressurized gases from the pressurized gas supply system, the control system including a first flow controller coupled to the first gas supply, a second flow controller coupled to the second gas supply, and a vacuum flow controller coupled to the vacuum pump,
  providing a pulse-conditioner coupled to the pressurized gas supply system to receive the flow of pressurized gases and configured to discharge the flow of pressurized gases in a controlled-profile gas pulse, the pulse-conditioner including an inflow channel fluidly coupled to the first flow controller and the second flow controller, an outflow channel fluidly coupled to the vacuum flow controller, and a nozzle fluidly coupled to the inflow channel to receive the flow of pressurized gases, directing the vacuum flow controller to open and evacuate any existing gas in the pulse-conditioner out through the outflow channel, directing the first flow controller to open and provide a flow of first gas from the first gas supply to the pulse-conditioner, directing the second flow controller to open and provide a flow of second gas from the second gas supply to the pulse-conditioner, circulating the flow of pressurized gases through the inflow channel and out the outflow channel to mix the flow of first gas and the flow of second gas, directing the vacuum flow controller to close and divert the flow of pressurized gases from flowing out through the outflow channel to deliver the flow of pressurized gases to the nozzle, discharging the flow of pressurized gases out through the nozzle to provide the controlled-profile gas pulse that has a cylindrical shape, and directing the vacuum flow controller to open after a predefined pulse duration to allow the flow of pressurized gases to be evacuated out through the outflow channel.

15. The method of claim 14, wherein the first gas supply is medical grade compressed air and the second gas supply is carbon-dioxide gas and the flow of pressurized gases has a desired mixture concentration that includes a concentration of carbon-dioxide gas that is different than that of ambient air.

16. The method of claim 15, wherein the pressurized gas supply system further includes a third gas supply and the control system further includes a third flow controller coupled to the third gas supply, and wherein the method further comprises directing the third flow controller to open and provide a flow of third gas from the third gas supply to the pulse-conditioner.

* * * * *